(12) United States Patent
Alexander

(10) Patent No.: US 6,322,311 B1
(45) Date of Patent: Nov. 27, 2001

(54) LOW PROFILE VEHICLE RESTRAINT

(75) Inventor: James C. Alexander, London (CA)

(73) Assignee: United Dominion Ind., Inc., Charlotte, NC (US)

( * ) Notice: Subject to any disclaimer, the term of this patent is extended or adjusted under 35 U.S.C. 154(b) by 0 days.

(21) Appl. No.: 09/511,908

(22) Filed: Feb. 23, 2000

(51) Int. Cl.$^7$ ................................................ B65G 69/00
(52) U.S. Cl. ............................................................. 414/401
(58) Field of Search .............................................. 414/401

(56) References Cited

U.S. PATENT DOCUMENTS

| | | | |
|---|---|---|---|
| 4,674,941 | * | 6/1987 | Hageman ............................. 414/401 |
| 4,915,568 | * | 4/1990 | West ..................................... 414/401 |
| 5,203,663 | * | 4/1993 | Ruppe .................................. 414/401 |
| 5,346,353 | * | 9/1994 | Alexander ............................ 414/401 |

* cited by examiner

Primary Examiner—Steven A. Bratlie
(74) Attorney, Agent, or Firm—Pepper Hamilton, LLP

(57) ABSTRACT

A vehicle restraint having a frame mounted to a dock face and a hook movable relative to the fixed member for engaging a portion of a vehicle and restraining movement of the vehicle away from the dock. The vehicle restraint has a linkage comprising a first arm pivotally connected to the frame, a second arm pivotally connected to the first arm and having a first end not fixed and movable with respect to the frame and a second end pivotally coupled to the hook, and a third arm coupling the first arm to the hook to maintain the hook in a generally vertical orientation. A sensor may be employed to determine engagement of the hook with a portion of the vehicle.

20 Claims, 3 Drawing Sheets

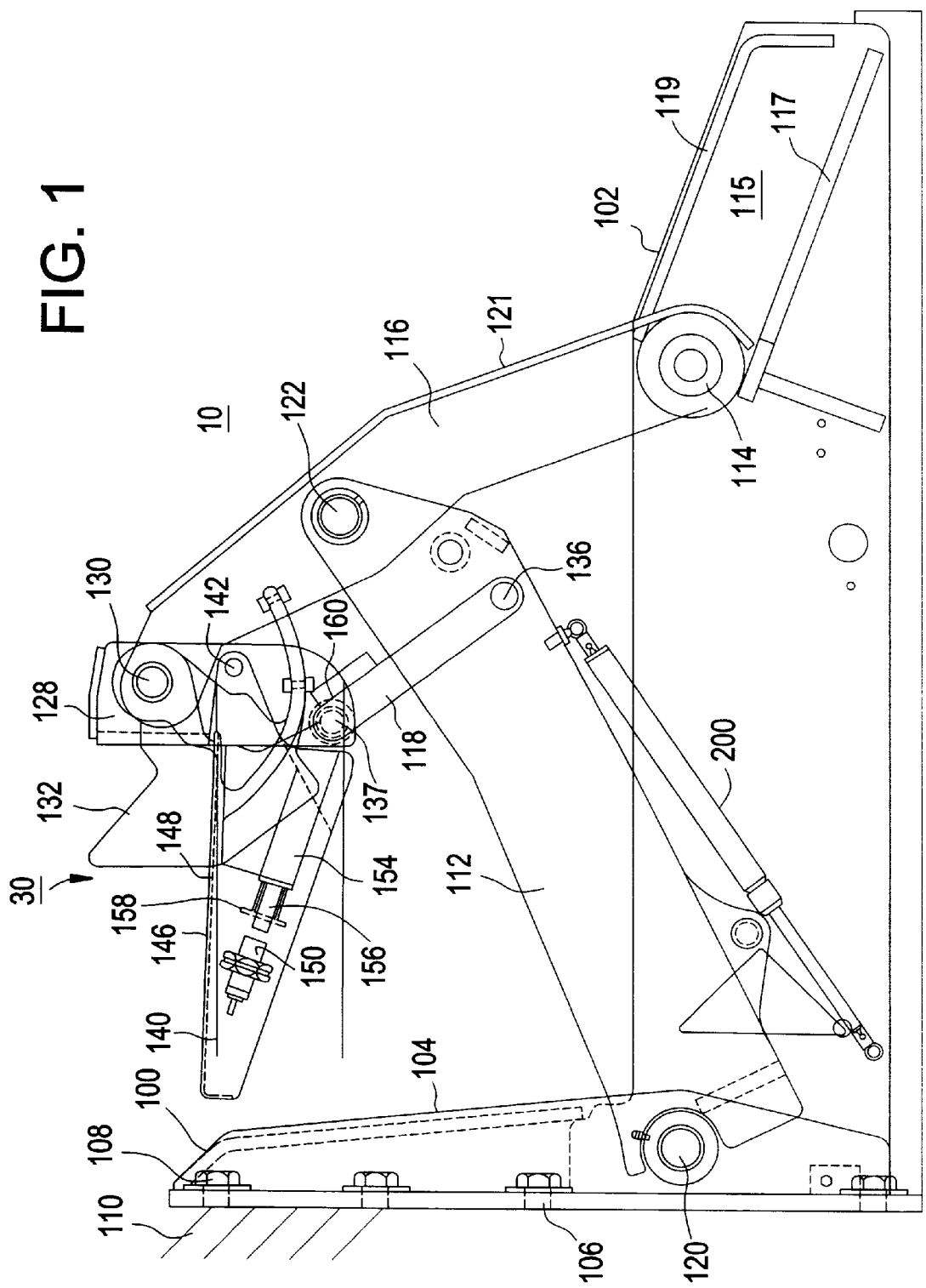

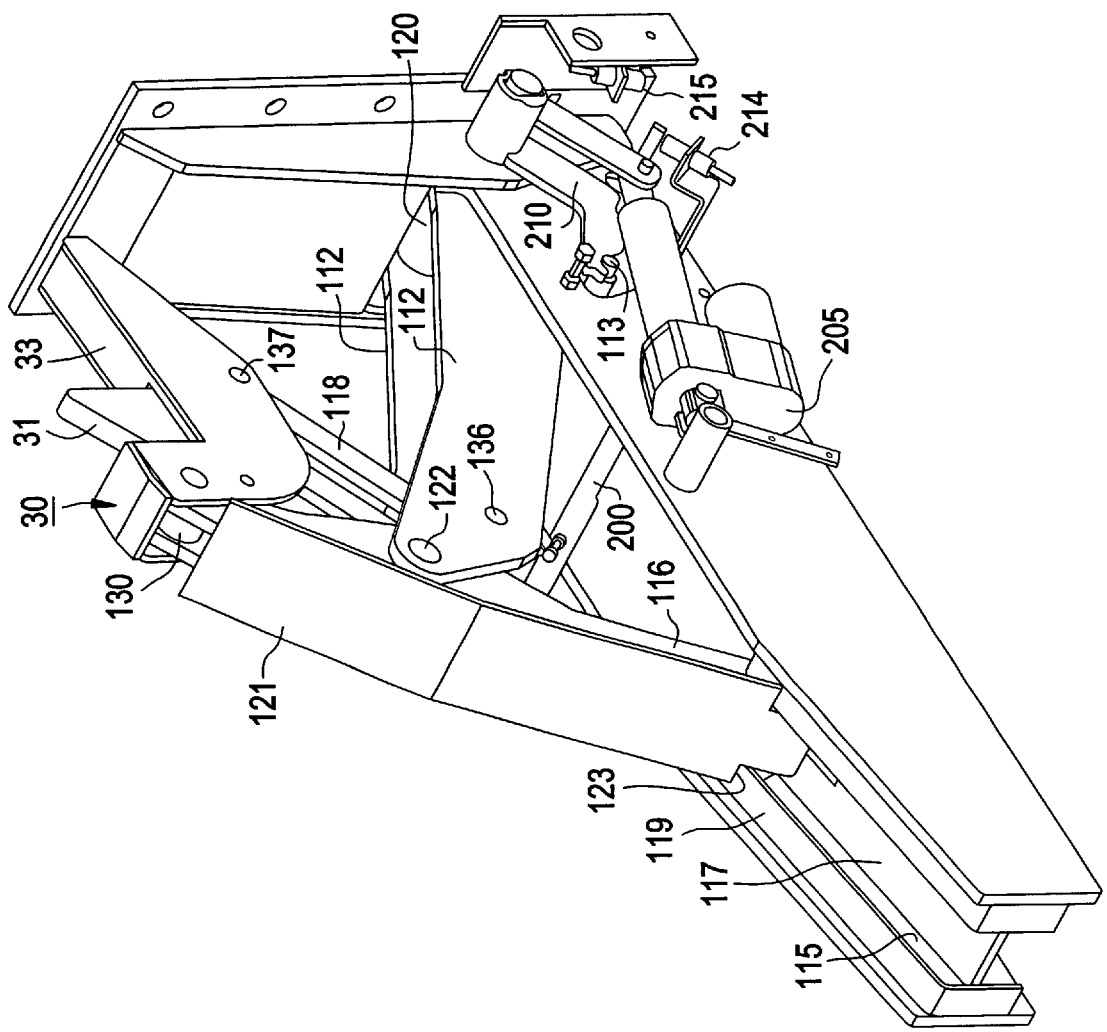

LOW PROFILE VEHICLE RESTRAINT

CROSS-REFERENCE

This application is related to U.S. patent application Ser. No. 08/921,019 filed on Aug. 29, 1997 now U.S. Pat. No. 6,033,174 and Ser. No. 09/035,032 filed Mar. 5, 1998 now U.S. Pat. No. 6,062,796.

I. BACKGROUND OF THE INVENTION

1. Field of the Invention

This invention relates to an improved system for restraining a vehicle such as a transport truck or trailer which is to be restrained from movement at a loading dock. This invention is also related to a sensing system for use with such a vehicle restraint.

2. Prior Art

A variety of techniques are known by which a vehicle is mechanically secured to prevent movement by using the ICC bar as the means to engage the truck or trailer. U.S. Pat. No. 4,127,856 Bickel describes the use of electrical switches to sense the engagement of the vehicle restraint with a bar mounted on the rear of a vehicle. The commercial use of locking devices is now well known in the art. For example, the Rite-Hite "Dok-Lok", Serco "VR" and Kelley "Truk Stop" and "Star" all have models that contact a vehicle ICC bar and constrain the truck from movement. Models of those systems generate signals to indicate that engagement has occurred so that personnel at the loading dock have an audible/visual indication of locking.

These techniques are mentioned or described in many U.S. Patents including, U.S. Pat. Nos. 4,267,748; 4,282,621; 4,488,325; 4,553,895; 4,692,755; 4,695,216; 4,759,678; 4,830,563; 4,843,373; 4,938,647; and 4,946,330.

One characteristic of previous ICC bar engagement devices is that the system had limits of engagement known as an "operating envelop". The ICC bar, by previous Governmental regulation could not be higher than 30 inches off the ground. This formed the upper limit of the operating envelop. The lower limit is not defined by regulation but determined as a function of trailer manufacturer (as is the case of the shape of the ICC barrier itself) and the degree of float of the truck as it is loaded and unloaded. Typically the lower limit was approximately 15 inches. Consequently, the operating envelop required that the vehicle restraint not only capture the ICC bar within that range but also have the ability to follow vertical movement as the vehicle "floated" during loading operations to maintain engagement. Moreover, the restraint has to lower and disengage from the ICC bar when the bar itself is at the lower end of the envelop or else the vehicle will remain constrained while loaded and ready to depart from the dock.

Contemporary designs for trailers are lowering the ICC bar clearance from the ground to about 10 inches. Prior systems due to mechanical configuration cannot operate within an envelop from 10 to 30 inches. The configuration of the devices even in the lowermost position project above 10 inches, whether track mounted or surface mounted. This will not allow them to engage, restrain and disengage a vehicle ICC within the totality of the contemporary operating envelop.

Thus a need currently exists for a vehicle restraint having the desirable characteristics of commercial devices but with an extended operating range.

Systems in use have electrical switches which generate a signal by the presence or absence of physical contact with a moving part. A switch senses a change in the position of a component of the restraining device. The switch does not directly sense the presence or absence of the bar mounted on the rear of a vehicle. While such systems generally function well, and provide useful information to the control system, there are two major deficiencies in all of the previous systems. First, the loading dock area and the rear end of trailers can be very harsh environment as a result of rain, snow, ice, road salt and other materials present at a loading dock. These devices use mechanical limit switches which have moving parts which can become corroded or made inoperative by ice, dirt or other debris. Even if the limit switch is an inductive proximity switch, it is still activated by the motion of a mechanical component of the restraining device, and are therefore is subject to malfunction or false signal if one of the moving components should become broken or stick from corrosion or other foreign matter. Consequently a need still exists in the art for improved sensing techniques, especially as the operating range of the restraint increases.

II. SUMMARY OF THE INVENTION

This invention, in a first preferred embodiment is directed to a low profile vehicle restraint. This invention employs the essential linkage of previous designs to enable the restraining hook to move in a vertical direction thus minimizing the degree to which the vehicle may move away from the loading dock. This embodiment however represents a departure by not fixing the geometry of the linkage so that the operating range may be extended.

In accordance with this invention the vehicle restraint comprises a frame mountable relative to a dock face and a linkage mounted to the frame about one pin. The linkage has a member movable with respect to the frame at a position spaced from the pin. The linkage moves a restraining structure in a vertical manner between a stored position and a restraining position as the member shifts position relative to said frame.

The frame further comprises a ramp surface and the member comprises a roller moving on the ramp surface. Sliding contact may also be employed if the frictional forces are not significant.

The linkage comprises a first arm pivotally connected to the frame, a second arm pivotally connected to the first arm and having the member, rolling or sliding, attached at a first end movable with respect to the frame. A second end is pivotally coupled to the restraining structure, and a third arm couples the first arm to the restraining structure to maintain the restraining structure in a generally vertical orientation. The second arm further comprises a flange section forming a top cover for the housing when said restraint is in a lowered stored position.

A gas spring biases the linkage in an upward position. Also, a powered mechanism may be employed to raise and lower said linkage and said restraining structure.

The vehicle restraint may also employ a sensor carried by the restraining structure to determine engagement with a vehicle. The restraining structure comprises a vertical member coupled to the second arm, and a horizontal member pivotally coupled to vertical member. The sensor comprises a proximity switch carried by said horizontal member.

The vehicle restraint of this invention may also use a restraining structure comprising a rigid hook and said sensor is embedded in said hook. Thus, in accordance with another preferred embodiment of this invention the sensor structure is completely embedded within a sensor bar that moves in response to contact with the vehicle. As a result issues of cost of multiple sensors, sensitivity and placement of the sensors are eliminated. Further, in accordance with the broader aspects of this invention exposure and potential damage of the sensors or plates is also eliminated.

This invention will be described in greater detail by reference to the attached drawing and the description of the preferred embodiments that follow.

III. BRIEF DESCRIPTION OF THE DRAWING

FIG. 1 illustrates a side cut away view of the low profile vehicle restraint of this invention with a hook member having a first type of sensor;

FIG. 3 is a perspective view illustrating a low profile vehicle restraint of this invention with a different hook structure from that of FIG. 1 and a mechanism to raise and lower the hook.

IV. DESCRIPTION OF THE PREFERRED EMBODIMENTS

Figure 2B:
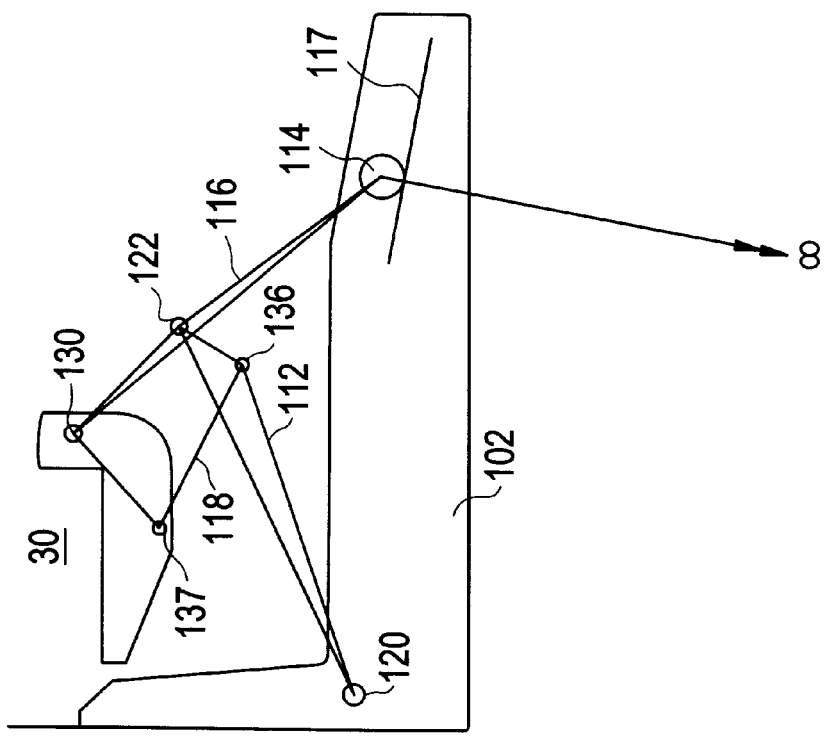
FIGS. 2A and 2B are schematic illustrations explaining the manner of motion for positioning the hook structure.

Referring now to FIG. 1, a vehicle restraint 10 is positioned on the driveway 1 and secured to a dock wall.

A frame 100 includes a housing 102 and a back-frame 104. The back-frame has a series of holes 106 with anchor bolts 108 to facilitate mounting to the wall 110 of a loading dock. While not illustrated, the device may be ground mounted by the use of legs attached to the bottom of the housing 102.

The linkage of this device will now be described. It is a departure from the 4-bar linkage of the Serco VR restraint, as described in U.S. Pat. No. 5,120,181. The linkage comprises a main arm, 112, an upper arm 116 and a hook strut 118. The main arm 112 is pivotally coupled to the frame at pivot pin 120. While FIG. 1 illustrates in side view one arm 112, the main arm comprises two such arms mounted to pivot pin 120 and attached to each side of the upper arm 116 at pin 122 as illustrated in FIG. 3. This configuration differs from the four-bar linkage of the prior art by the elimination of the arm strut which would be pivotally mounted to the housing and to the upper arm. That geometry was fixed.

In accordance with this invention the geometry is variable by the use of a roller 114 on a guide 115. Consequently the position of the lower pivot point for the upper arm 116 changes to allow the restraint to achieve an increased operating envelop, especially at the lower end of the operating range. The guide 115 is inclined as illustrated in FIG. 1 and comprises a ramp surface 117 and an upper track 119.

Figure 2A:
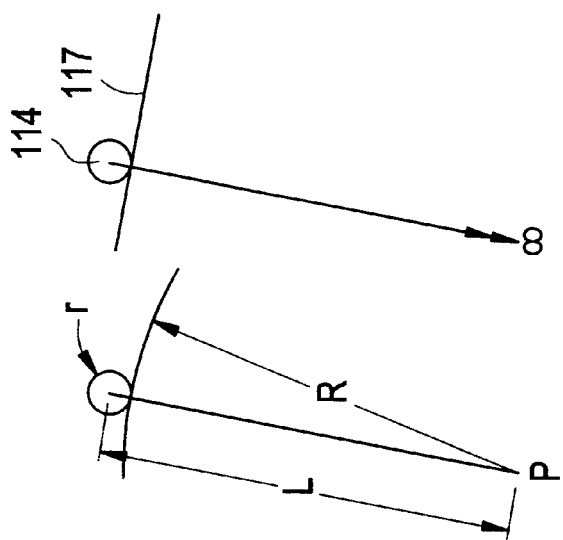

The principle of operation is illustrated in FIGS. 2A and 2B. The links 112, 116 and 118 are illustrated as fixed line segments. The roller 114 having a radius "r" moving on a curved surface of radius "R" has the same motion as the end of a bar having a length "L" where L=r+R rotating about a fixed point "P". If R is infinite because the curvature of the surface 117 is flat an equivalent motion to that of a pivoting bar of infinite length occurs. Thus, as illustrated in FIG. 2B the rolling movement of the roller 114 on the ramp surface 117 can be defined as equivalent to a pivot arm of infinite length. This in turn allows the entire linkage to raise and lower over an operating range that is not constrained by the length of the fixed members and the geometric position of each fixed pivot point as in the case of a four-bar linkage.

FIG. 1 illustrates the restraint in the upper position at the maximum extent of travel. In operation when the device is retracted the roller 114 will move the right, as illustrated in FIG. 1, effectively changing the location of the pivot point of upper arm 116 with respect to the frame. The hook lowers but is maintained in the same vertical plane as a consequence of the fixed geometry between arms 112, 116 and 118. It therefore can follow the movement of the ICC bar without any substantial horizontal component to its travel.

Moreover, the linkage can be stored within the housing 102 at height of about nine inches above the ground position. This in turn permits the device to raise only slightly from the housing and engage at a minimum height of about ten inches above the ground.

As illustrated in FIG. 3, the upper arm 116 has a cover section 121 that forms a top cover for the restraint when it is fully retracted. Notches 123 are formed in the cover 121 to facilitate movement of the roller 114 yet, the cover still effectively covers the device when it has been retracted. The contour of the cover section 121 is such that when the device is retracted a portion is substantially horizontal to follow the profile of the top of the housing 102. While not illustrated, a separate cover member may be hinged to the housing 102 over the ramp 117 in sliding contact with cover section 121 to offer additional protection to that portion of the device.

The restraint mechanism may optionally utilize a variety of different types of sensor arrangements. These may be the contact or non-contact types. A contact type is illustrated in the configuration of FIG. 1. It comprises a vertical member 128 coupled to the upper arm 116 by pin 130. The vertical orientation of the member 128 is maintained by means of hook strut 118. Hook strut 118 is coupled between the main arm 112 and the vertical member 128 by pins 136 and 137. As illustrated in FIG. 3 the assembly employs two hook struts.

In this preferred embodiment of the low profile restraint there is no horizontal portion of the hook. This is illustrated in FIG. 1. The orientation of the restraint member to achieve engagement with a vehicle and maintain that orientation is achieved by having the linkage couple the vertical blocking member to the hook strut.

The primary restraint is the member 128. A secondary hook 132 pivots about pin 130 and is biased upward by a spring, not illustrated. By this technique dual hooking positions are achieved minimizing the distance a vehicle may move away from the dock before restraining action occurs. Obviously if the ICC bar contacts the secondary hook 132, it will depress it and the primary restraining surface is then vertical member 128.

A gas spring 200 is coupled between the main arm 112 and the housing 102 to upwardly bias the linkage and the hook assembly. The gas spring has sufficient force so that it can support the assembly with an excess upward force in the range of 70 lbs. yet be responsive to up and down movements of the vehicle during loading-unloading conditions (float) to maintain the restraint in engagement. It will be understood that a second gas spring will typically be mounted to the second main arm.

The sensor comprises a pivoting bar 140. This bar is mounted to the vertical member 128 by pivot pin 142. The contour of the bar 140 is such that at the interface with the vertical member a lever arm exists within the vertical member permitting pivotal motion about pin 142. Thus the pivot point 142 is placed a distance from the restraining wall of vertical member to provide a sufficient lever arm permitting rotation of the sensor bar where ever it is impacted by the vehicle. The sensor bar 140 is a unitary element having a solid upper face 146 with the exception of a cutout 148 for the secondary hook 132.

The sensor bar 140 serves as the internal housing and mounting for a switch 150 that is affixed to the sensor bar in a convenient manner. The switch 150 may be of the proximity type. Mounted in the sensor bar, the switch 150 moves with the sensor bar 140 as that element pivots about pin 142. An arm 154 projects from pivot 137 and carries a target 156 at the other end. A target guide plate 158 is fixed to the interior of the sensor bar 140 and has a hole through which the target 156 passes. The sensor bar 140 is upwardly biased by means of a spring 160 bearing against the guide plate 158 and the end of arm 154. The hole in the guide plate is free to shift axially with respect to the target 156 as the sensor bar rotates.

In operation, the vehicle, not illustrated, will be backed into position against bumpers mounted to the wall of the loading dock. Typically the ICC bar will be positioned over the restraint and the device will be released to raise into position, upwardly biased by the gas springs 200. When the sensor bar 140 contacts the ICC it will rotate about pin 142 in a counterclockwise direction, downward. This in turn will decrease the distance between the switch 150 and the target 156, i.e. the switch and the guide plate 158 will move outward relative to the target as the sensor bar rotates counterclockwise. As a result, a signal indicating engagement will be generated by the switch.

Since the entire unit is upwardly biased by the gas spring, further downward force will result in the entire hook and linkage structure moving downward but engagement is still maintained and the distance between the switch 150 and the target 158 such that the engagement signal is still generated. If the vehicle is being unloaded, the unit will tend to move upward. However, the spring force of the gas spring is greater than that of the force applied to rotate the sensor bar so the entire unit moves upward following the vertical movement of the truck as a result of the upward bias of the gas spring.

If the device is actuated but does not contact the ICC bar, it will raise to the full extent of vertical travel of the linkage without any rotation of the sensor bar. In this case since there is no engagement with the vehicle no engagement signal will be generated. Additionally, since the engagement signal occurs because of positive rotation of the sensor bar there are no dead spots caused by ICC bar contact to the hook structure near the vertical member or the secondary hook.

The low profile restraint may also employ a hook structure with a rigid hook having a horizontal portion as an integral portion of the hook 30. As illustrated in FIG. 3 a rigid hook is used with the low profile linkage mechanism of this invention. That rigid hook may also employ a secondary hook 31. The use of sensors is optional depending on the configuration desired. If sensors are used to determine engagement with the ICC bar they may be of the non-contact type described and illustrated in co-pending U.S. application Ser. No., 08/921,019 now U.S. Pat. No. 6,033,174, which is expressly incorporated by reference. It will be appreciated that such non-contact sensors would be embedded under the plate 33 which is in contact with the ICC bar.

FIG. 3 illustrates that the unit may be powered up or down into a retracted position in the housing. That mode of powering the linkage up and down is disclosed in U.S. Pat. No. 5,336,033 which is expressly incorporated by reference. The system uses an actuator 205 operatively coupled by lever member 210 to a pin 113 on the main arm 112. Additionally, sensors 214 and 215 are employed to determine when the device is fully raised to the operative position or fully retracted to discontinue operation.

It is apparent that modifications of this invention may be practiced without departing from the scope of this invention. For example, while two hook configurations are illustrated, each with a secondary hook, that feature may be eliminated. Also, while different sensing techniques to determine engagement are disclosed the invention is not so limited. Similarly, different techniques of raising and restoring the restraint may be practiced within the scope of this invention.

I claim:

1. A vehicle restraint comprising: a frame mountable relative to a dock face, a linkage mounted to said frame about one pin, said linkage having a member movable with respect to said frame at a position spaced from said pin, and a vertically oriented restraining structure attached to said linkage at a top portion of said restraining structure for moving said restraining structure in a vertical manner between a stored position and a restraining position as said member shifts position relative to said frame.

2. A vehicle restraint of claim 1 wherein said frame further comprises a ramp surface and said member comprises a roller moving on said ramp surface.

3. A vehicle restraint of claim 1 wherein said linkage comprises a first arm pivotally connected to said frame, a second arm pivotally connected to said first arm and having said member attached at a first end movable with respect to said frame and a second end pivotally coupled to said restraining structure, and a third arm coupling said first arm to said restraining structure to maintain said restraining structure in a generally vertical orientation.

4. A vehicle restraint of claim 3 wherein said second arm further comprises a flange section forming a top cover and defining with said frame a housing for said restraint it is in a lowered stored position.

5. A vehicle restraint of claim 1 further comprising means to bias said linkage in an upward position.

6. A vehicle restrain of claim 1 further comprising a mechanism to raise and lower said linkage and said restraining structure.

7. A vehicle restraint of claim 1 further comprising a sensor carried by said restraining structure to determine engagement with a vehicle.

8. A vehicle restraint of claim 7 wherein restraining structure comprises a vertical member coupled to said linkage, an horizontal member pivotally coupled to vertical member and said sensor comprises a proximity switch carried by said horizontal member.

9. A vehicle restraint of claim 7 wherein said restraining structure comprises a rigid hook and said sensor is embedded in said hook.

10. A vehicle restraint of claim 1 further comprising means to attach said restraint to a dock face.

11. A vehicle restraint comprising: a frame mountable relative to a dock face, a linkage mounted to said frame for moving a restraining structure in a vertical manner between a stored position and a restraining position, said linkage comprising a first arm pivotally connected to said frame, a second arm pivotally connected to said first arm and having a first end not fixed and movable with respect to said frame and a second end pivotally coupled to said restraining structure, and a third arm coupling said first arm to said restraining structure to maintain said restraining structure in a generally vertical orientation.

12. A vehicle restraint of claim 11 wherein said restraining structure comprising a vertical member forming a barrier for preventing outward movement of a vehicle and a secondary hook mounted to said vertical member and movable relative to said vertical member for engaging a portion of a vehicle and restraining movement of said vehicle.

13. A vehicle restraint of claim 12 further comprising a sensor bar pivotally connected to said vertical member, said sensor bar determining engagement of said restraint structure with a portion of said vehicle, a sensor positioned within said sensor bar and movable therewith and not in contact with said vehicle and a target member mounted in proximity to said sensor to provide an indication of the displacement of said sensor bar as it pivots.

14. A vehicle restraint of claim 13 wherein said sensor comprises at least one proximity switch mounted in said sensor bar.

15. A vehicle restraint of claim 14 wherein said sensor bar comprises an elongated member facing inward toward said frame, said vertical member having an internal pivot pin and said sensor bar having a portion internal to said vertical member and positioned to allow rotation of said sensor bar about said pivot pin.

16. A vehicle restraint of claim 13 further comprising an arm mounting said target, said arm operatively connected at one end to said vertical member and extending inside said sensor bar.

17. A vehicle restraint of claim 16 further comprising a spring mounted on said arm.

18. A vehicle restraint of claim 12, further comprising a spring connected to said secondary hook and said linkage to bias said secondary hook into an upward position.

19. A vehicle restraint of claim 11 further comprising a gas spring connected to said first arm and said frame to upwardly bias said linkage.

20. A vehicle restraint of claim 11 further comprising a sensor carried by said restraining structure to determine engagement with a vehicle.

* * * * *